(12) United States Patent
Baum et al.

(10) Patent No.: US 7,651,151 B2
(45) Date of Patent: Jan. 26, 2010

(54) CONVERTIBLE

(75) Inventors: Marian Daniel Baum, Osnabrück (DE);
Sven Hollenbeck, Westerkappeln (DE)

(73) Assignee: Wilhelm Karmann GmbH, Osnabrueck ( * ) Notice: Subject to any disclaimer, the term of this patent is extended or adjusted under 35 U.S.C. 154(b) by 0 days.

(21) Appl. No.: 10/596,246

(22) PCT Filed: Nov. 26, 2004

(86) PCT No.: PCT/DE2004/002626

§ 371 (c)(1),
(2), (4) Date: Oct. 19, 2006

(87) PCT Pub. No.: WO2005/056323

PCT Pub. Date: Jun. 23, 2005

(65) Prior Publication Data

US 2007/0069546 A1    Mar. 29, 2007

(30) Foreign Application Priority Data

Dec. 6, 2003  (DE) ............................ 103 57 098

(51) Int. Cl.
*B60J 7/08* (2006.01)
(52) U.S. Cl. .................................. 296/107.01
(58) Field of Classification Search ........... 296/107.01, 296/107.08, 107.16
See application file for complete search history.

(56) References Cited

U.S. PATENT DOCUMENTS

| | | | | | |
|---|---|---|---|---|---|
| 3,473,842 A | * | 10/1969 | Glossop, Jr. et al. | ........ | 296/116 |
| 3,608,956 A | * | 9/1971 | Adamski | ............ | 296/117 |
| 5,533,777 A | * | 7/1996 | Kleemann et al. | ........... | 296/117 |
| 5,645,309 A | * | 7/1997 | Graf | ............ | 296/121 |
| 5,671,966 A | * | 9/1997 | Busch | ............ | 296/107.16 |
| 6,048,021 A | * | 4/2000 | Sautter, Jr. | ............ | 296/117 |
| 6,312,042 B1 | * | 11/2001 | Halbweiss et al. | ......... | 296/108 |
| 6,390,530 B1 | * | 5/2002 | Maass | ............ | 296/107.09 |
| 6,508,502 B2 | * | 1/2003 | Willard | ............ | 296/107.07 |
| 6,604,775 B2 | * | 8/2003 | Obendiek | ............ | 296/108 |
| 6,629,719 B2 | * | 10/2003 | Sims | ............ | 296/109 |
| 6,659,534 B2 | * | 12/2003 | Willard | ............ | 296/108 |
| 6,871,899 B2 | * | 3/2005 | Mandl et al. | ............ | 296/107.12 |
| 7,032,951 B2 | * | 4/2006 | Powell | ............ | 296/107.01 |
| 7,093,884 B2 | * | 8/2006 | Eichhorst et al. | ............ | 296/105 |
| 2001/0040385 A1 | * | 11/2001 | Obendiek | ............ | 296/108 |

(Continued)

FOREIGN PATENT DOCUMENTS

WO    WO0243978    *    6/2002

*Primary Examiner*—H Gutman
(74) *Attorney, Agent, or Firm*—Quinn Law Group, PLLC

(57) ABSTRACT

A convertible vehicle with a movable roof and at least one movable cover part that in its closed position, covers a receiving area for the opened roof situated in the auto body and which can be moved up by at least one drive element is provided. The at least one drive element is arranged on a fastening device that can be mounted on the auto body which is also a support for at least one control unit, a hydraulic pump and connections of control lines leading to the drive units for roof movement. A multifunctional holding or fastening device with several connection flanges to accommodate at least one control unit, a pump, and connections for emerging hydraulic lines is also provided. The multifunctional holding device is designed as a support for at least one drive element for a cover part of a compartment top of a convertible vehicle.

7 Claims, 5 Drawing Sheets

U.S. PATENT DOCUMENTS

| | | | |
|---|---|---|---|
| 2001/0042991 A1* | 11/2001 | Schuler et al. | 296/107.08 |
| 2001/0042992 A1* | 11/2001 | Obendiek | 296/107.17 |
| 2002/0105205 A1* | 8/2002 | Willard | 296/107.07 |
| 2002/0171258 A1* | 11/2002 | Obendiek | 296/107.08 |
| 2003/0052507 A1* | 3/2003 | Obendiek et al. | 296/107.01 |
| 2003/0057728 A1* | 3/2003 | Sims | 296/107.08 |
| 2004/0145210 A1* | 7/2004 | Fuchs et al. | 296/107.08 |
| 2004/0178656 A1* | 9/2004 | Hahn | 296/107.08 |
| 2005/0285428 A1* | 12/2005 | Dilluvio | 296/107.08 |
| 2007/0194595 A1* | 8/2007 | Papendorf | 296/107.01 |

* cited by examiner

CONVERTIBLE

CROSS-REFERENCE TO RELATED APPLICATION(S)

This application is a U.S. National Phase of International Application No. PCT/DE 2004/002626, filed Nov. 26, 2004, which claims priority to German 103 57 098.5, filed Dec. 6, 2003. The entire contents of the above identified applications are incorporated herein by reference.

TECHNICAL FIELD

The present invention relates to a convertible vehicle with a movable roof, as well as a fastening device with several connection flanges designed as a support for one or more drive elements for a cover part of the movable roof of the convertible vehicle.

BACKGROUND OF THE INVENTION

It is known to arrange a holding device that has a pump to generate pressure, a control device, and a connection element for connection of hydraulic lines that, in turn, control the hydraulic cylinder as drive units for roof movement, in a convertible vehicle with a hydraulically movable roof.

Since in many cases the roof in the closed state is held on a cover part on the auto-body side with its rear area, which must be opened to retract the roof, an additional assembly expense is produced for the drive devices that are to permit this movement. Assembly is therefore complicated overall and must be done in several steps.

DE 100 52 001 A1 shows a top-compartment cover, movable over an auxiliary frame, in which a drive element responsible for its movement engages on the auxiliary frame. The roof-movement mechanism is completely separated from the movement mechanism of the top-compartment cover.

DE 38 26 789 C2 concerns a control system that adjusts the movement of the roof and the top-compartment cover to each other. Assignment of end switches to different components is mentioned, assignment of additional drive or control parts is not.

SUMMARY OF THE INVENTION

The problem underlying the invention is to simplify the assembly of convertible vehicles of the type mentioned.

The present invention solves this problem by a convertible vehicle with a movable roof and at least one movable cover part that, when in a closed position, covers a receiving area for the opened roof situated in the auto body, and which can be moved up by at least one drive element. In addition, an attachment device is provided that is designed as a support for the one or more drive elements for the cover part of the movable roof.

According to the invention, one or more drive elements for moving the cover part need not be mounted separately on the body, but can be attached to the holding device that also carries elements for moving the roof. This attachment device can therefore be completely equipped before being assembled on the body and inserted as a module, which reduces the assembly expense on the vehicle. The drive element(s) mounted on the holding device for the cover part then need(s) only still be fastened to it with its/their corresponding free end.

Although the holding device can not only be pre-installed outside of the body, which is an advantage, but can also be filled with hydraulic fluid and be checked for function of both the drive element(s) for the cover part and the drive units for moving the roof, an additional simplification of the production process and shifting of the work steps from final assembly to up-line module production are achieved.

A particularly space-saving arrangement is offered when the holding device can be mounted in a side receptacle of the body in front of or behind a wheel well.

In particular, minimization of the number of required parts is achieved when the cover part is advantageously movable by a single actuator, which is made possible by using a cover part made of a lightweight material, for example, plastic or metal foam, and is achieved for the first time with this invention also using an eccentric drive element.

Additional advantages and features of the invention can be seen from a practical example of the object of the invention, described below and shown at least schematically in the drawing.

DESCRIPTION OF THE PREFERRED EMBODIMENTS

Figure 1:
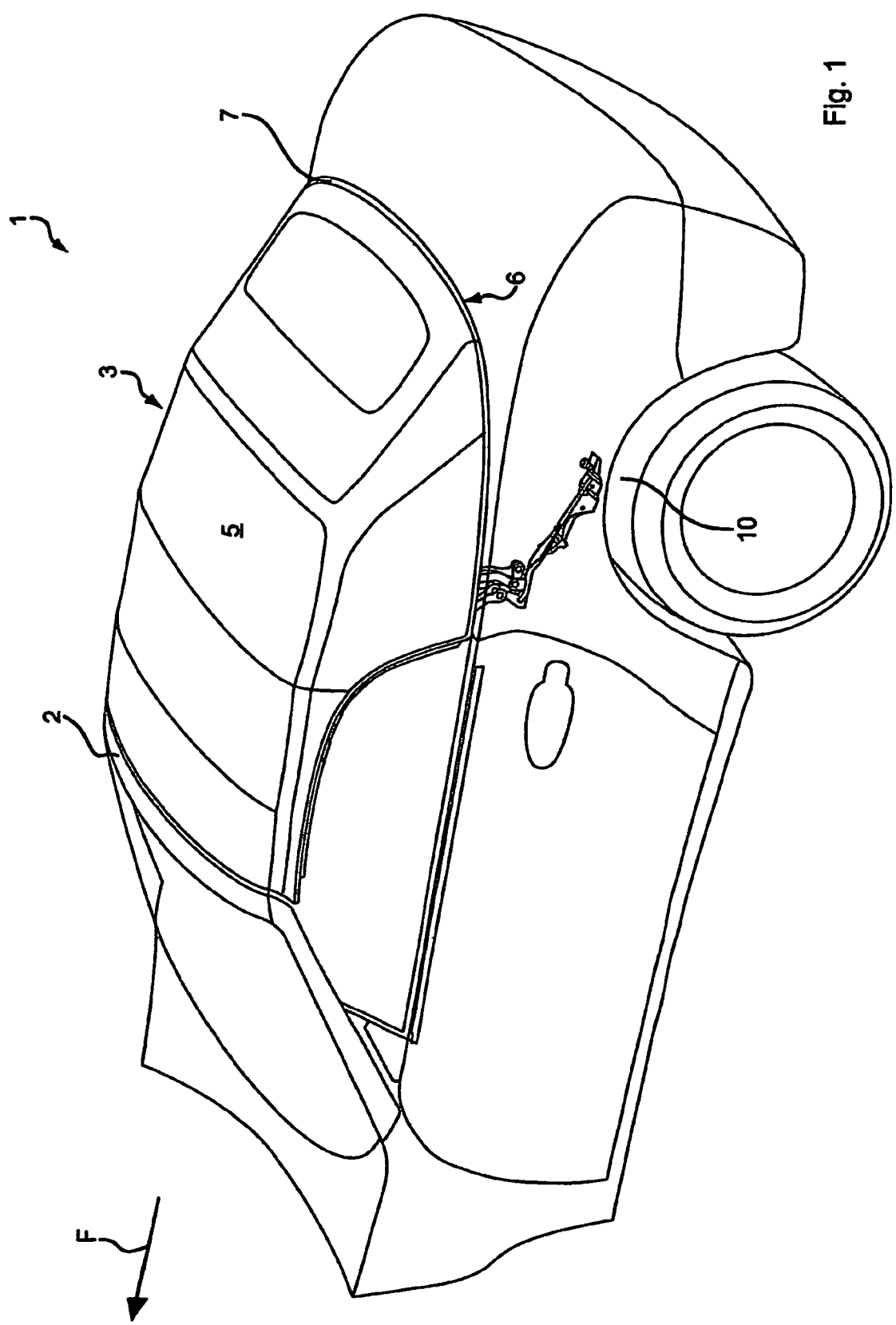
FIG. 1 shows a vehicle according to the invention in a perspective view obliquely from the rear with a completely closed roof.

A two-seat vehicle 1 is generally shown in the drawing figures. However, the invention is just as applicable to a four- or five-seat convertible vehicle provided with rear seats.

The vehicle 1 includes in its upper area a roof 3, movable by drive units 4, directly or indirectly adjacent to a windshield frame 2, which can include, at least in areas, a flexible roof cover 5 and/or several rigid plate parts (not shown). The roof configuration can be designed as required.

In the pictured embodiment, the roof 3 includes near the rear end (or edge) area a tensioning bow 6, which lies on top of a moveable cover part 7 of the body.

However, it is not essential for the tensioning bow 6 of the roof 3 to lie on the cover part (tonneau cover) 7, but the cover part 7 can also lie behind (adjacent to) the rear edge of the roof 3. In either case, the cover part 7 must be moved to allow opening and closing of the roof 3. For moving the cover part 7, at least one drive element 8, here a hydraulic cylinder, is provided.

In the practical example, the cover part 7 is made of a lightweight material. Its deployment and retraction movements are caused by a single drive element 8. This is also assigned to only one transverse side of the cover part 7, i.e., well outside of the center.

Figure 5:
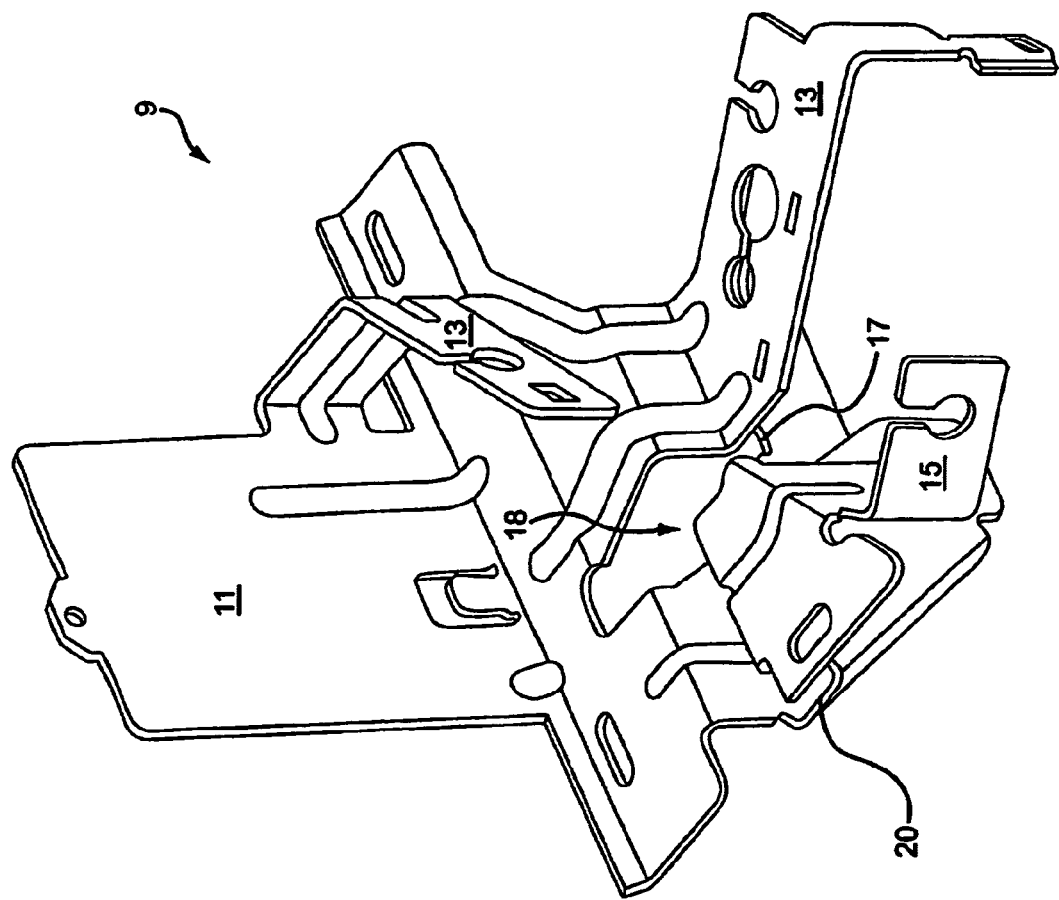
FIG. 5 shows the holding device according to FIG. 4 in the still unequipped state.

The drive element 8 is attached on one end to a holding (or fastening) device, designated overall by 9 and shown in FIG. 5 as a single part. Because of the arrangement of drive element 8 on only one side, it is possible to arrange the holding device 9 in an auto-body receptacle on the side in front of or behind a wheel well 10 in a space-saving fashion (FIG. 2).

Figure 4:
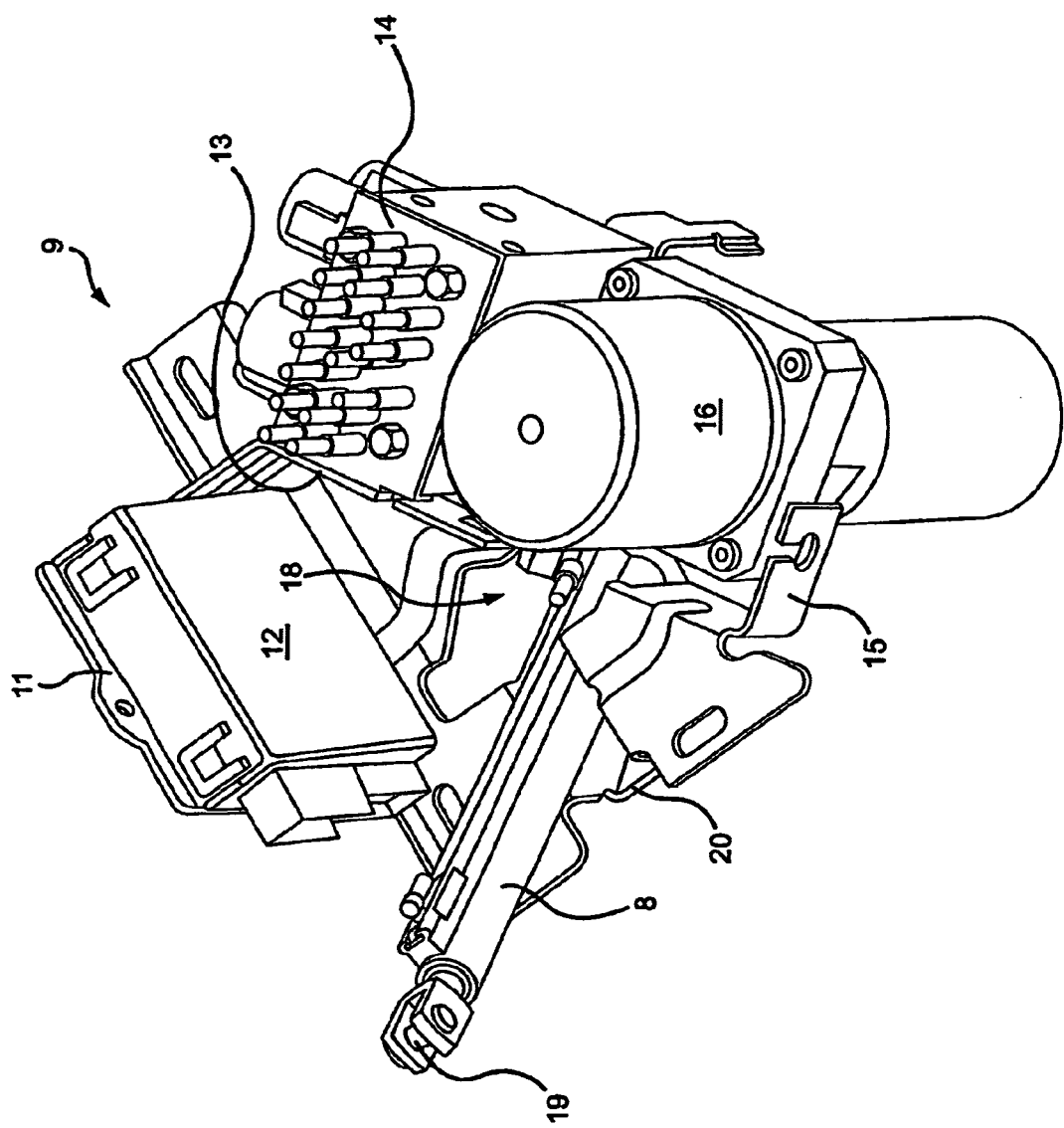
FIG. 4 shows the holding device drawn in FIGS. 2 and 3 before assembly, but already in the equipped state in an individual part view.

The holding device 9 can be formed in one piece from a plate that has been beveled several times. It has a first connection flange 11 to hold a control unit 12, a second connection flange 13 to hold hydraulic connections 14 for the control line, and a third connection flange 15 to hold a hydraulic pump 16. In addition, in the lower area, a connection flange 17 to mount the drive element 8 for the cover part 7 is provided, which, in the installed state, passes through a passage opening 18 of fastening device 9 and, in so doing, can point upward (FIG. 4). The free end 19 of the drive element 8 is therefore situated, when the fastening device 9 is installed, in a position in which it can be connected to the cover part 7. The passage opening 18 can include a support capability 20, here an edge, for the drive element 8, so that this cannot pivot away downward, despite the pivotable arrangement on fastening device 9, and the free end points upward in a manner suitable for assembly.

Figure 3:
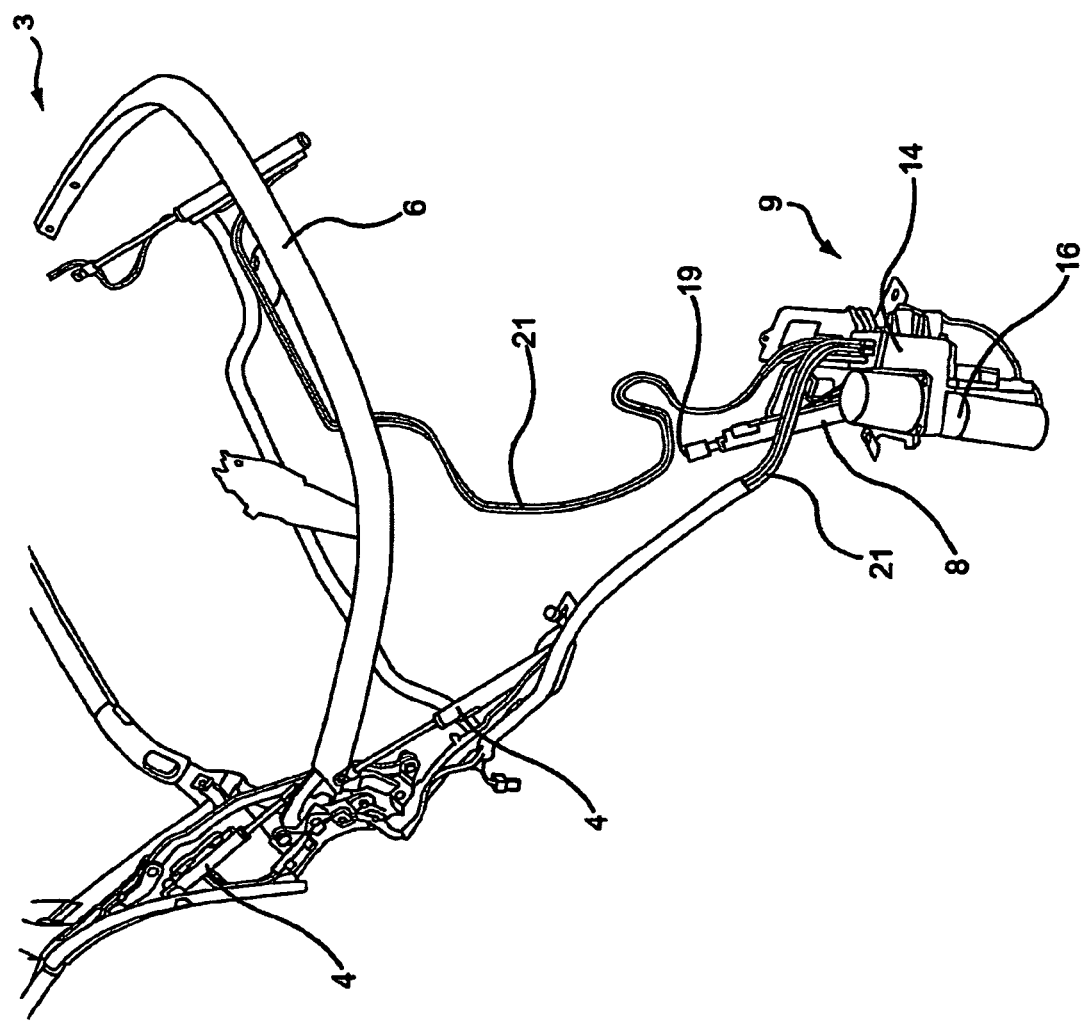
FIG. 3 shows a similar view to FIG. 2, but before assembly of the module containing the holding device and therefore without a surrounding vehicle body.

The holding device can be fully equipped outside the auto body (FIG. 4), and it can also be connected to the roof 3 by control lines 21, so that even before assembly, the unit shown in FIG. 3 can be checked for function, both in terms of the drive element 8 and the roof movement, after the control lines 21 are filled with hydraulic fluid.

Figure 2:
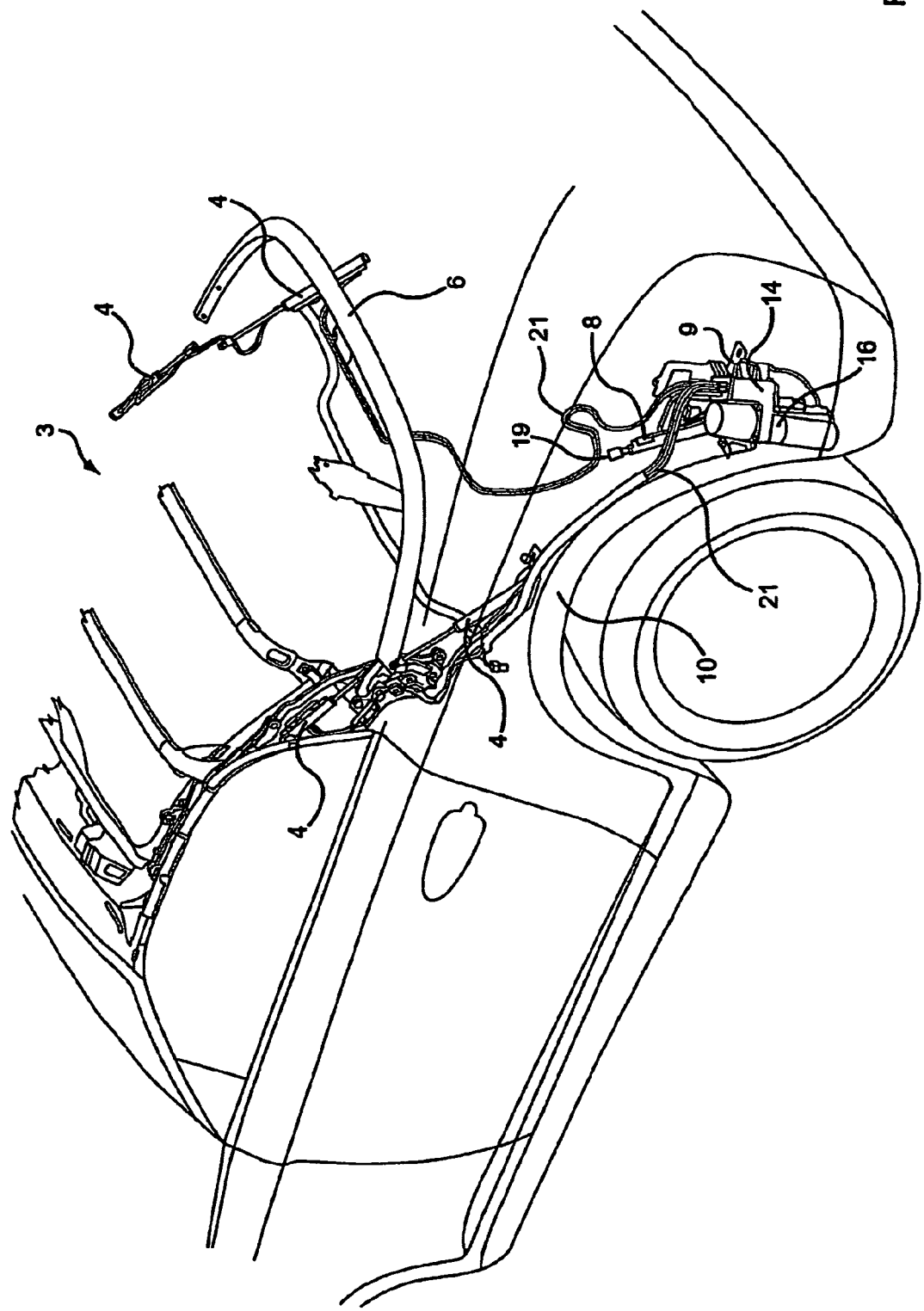
FIG. 2 shows a similar view to FIG. 1, but without the roof cover being shown and therefore with the body shown as transparent, revealing the holding device mounted on the body and the drive parts of the roof and the cover part.

The unit shown in FIG. 3 can then be sent as a complete module for assembly of the auto body, so that the installed position shown in FIG. 2 is produced—in which reference 5 is not shown, merely for clarity.

In the practical example shown here, a single holding device 9 of the type mentioned is sufficient, so that additional weight and space requirements are both minimized.

While the best modes for carrying out the invention have been described in detail, those familiar with the art to which this invention relates will recognize various alternative designs and embodiments for practicing the invention within the scope of the appended claims.

The invention claimed is:

1. A convertible vehicle (1) having an auto body with a movable roof (3) and at least one movable cover part (7) that covers a receiving area for the roof (3) situated in the auto body when the at least one movable cover part (7) is in a closed position and the movable roof (3) is in an open position, and which is configured to be moved up by at least one drive element (8),
    characterized in that the at least one drive element (8) is arranged on a holding device (9) that is configured to be mounted on the auto body and support at least one control unit (12), a hydraulic pump (16) and connections (14) of control lines (21) leading to drive units (4) for roof movement;
    wherein the holding device (9) includes;
        a first connection flange (11) configured to support the control unit (12),
        a second flange (13) configured to hold the hydraulic connections (14) for the control lines (21),
        a third flange (15) configured to hold a hydraulic pump (16), and
        a lower area flange (17) configured to mount the drive element (8) for the cover part (7).

2. A convertible vehicle (1) according to claim 1, characterized in that the holding device (9) is configured to be preinstalled outside of the auto body and checked for function of both the at least one drive element (8) for the cover part (7) and the drive units (4) for moving the roof.

3. A convertible vehicle (1) according to claims 1, characterized in that the holding device (9) is configured to be installed in a side receptacle of the auto body in front of or behind a wheel well (10).

4. A convertible vehicle (1) according to claim 1, characterized in that the holding device (9) includes a one-piece, multiply beveled plate provided with holes and connection flanges (11, 13, 15, 17).

5. A convertible vehicle (1) according to claim 1, characterized in that the cover part (7) is configured to be moved by a single drive element (8).

6. A convertible vehicle (1) according to claim 1, characterized in that the at least one drive element (8) passes through a passage opening (18) defined by the holding device (9).

7. The vehicle of claim 1, wherein the at least one drive element (8) is a hydraulic cylinder.

* * * * *